(12) United States Patent
Ahmad et al.

(10) Patent No.: US 12,248,357 B1
(45) Date of Patent: Mar. 11, 2025

(54) POWER MANAGEMENT IN DETERMINISTIC TENSOR STREAMING PROCESSORS

(71) Applicant: Groq, Inc., Mountain View, CA (US)

(72) Inventors: Omar Ahmad, San Carlos, CA (US); Geert Rosseel, La Honda, CA (US)

(73) Assignee: GROQ, Inc., Mountain View, CA (US)

( * ) Notice: Subject to any disclaimer, the term of this patent is extended or adjusted under 35 U.S.C. 154(b) by 0 days.

(21) Appl. No.: 17/480,074

(22) Filed: Sep. 20, 2021

Related U.S. Application Data

(60) Provisional application No. 63/081,241, filed on Sep. 21, 2020.

(51) Int. Cl.
| | |
|---|---|
| *G06F 1/26* | (2006.01) |
| *G06F 1/28* | (2006.01) |
| *G06F 1/32* | (2019.01) |
| *G06F 1/3296* | (2019.01) |
| *G06N 20/00* | (2019.01) |

(52) U.S. Cl.
CPC .............. *G06F 1/3296* (2013.01); *G06F 1/28* (2013.01); *G06N 20/00* (2019.01)

(58) Field of Classification Search
CPC ............................. G06F 1/3296; G06N 20/00
See application file for complete search history.

(56) References Cited

U.S. PATENT DOCUMENTS

| | | | |
|---|---|---|---|
| 8,225,112 B2 | 7/2012 | Koul et al. | |
| 10,425,068 B1 * | 9/2019 | Schat | H03K 3/84 |
| 10,516,383 B1 | 12/2019 | Honnavara-Prasad | |
| 10,840,723 B1 * | 11/2020 | Rafferty | H02J 7/00034 |
| 11,635,739 B1 * | 4/2023 | Sodani | G06N 20/00 |
| | | | 713/320 |
| 11,892,896 B2 | 2/2024 | Honnavara-Prasad | |
| 11,960,346 B1 | 4/2024 | Sproch et al. | |
| 2012/0203419 A1 * | 8/2012 | Tucker | G05D 1/0055 |
| | | | 701/23 |

(Continued)

OTHER PUBLICATIONS

Ahmad, et al. "Using Game Theory for Scheduling Tasks on Multi-Core Processors for Simultaneous Optimization of Performance and Energy" 2008 IEEE International Symposium on Parallel and Distributed Processing, Apr. 2008, 6 pages.

*Primary Examiner* — Mohammed H Rehman
(74) *Attorney, Agent, or Firm* — Dority & Manning, P.A.

(57) ABSTRACT

Embodiments pertain to reducing power consumption in a computing system comprising one or more deterministic processors. A controller generates a plurality of control signals for a voltage regulator to regulate a supply voltage of a respective one of the one or more deterministic processors. A power management module determines an initial profile for power consumption and performance of an algorithm executed on the respective deterministic processor having an initial value for the supply voltage and an initial value for a clock frequency. The power management module further determines a target profile for power consumption and performance of the algorithm executed on the respective deterministic processor. The controller modifies the plurality of control signals based on the initial profile and the target profile. The respective deterministic processor executes the algorithm while the supply voltage is dynamically modified by the voltage regulator based on the modified plurality of control signals.

23 Claims, 7 Drawing Sheets

(56) References Cited

U.S. PATENT DOCUMENTS

| | | | |
|---|---|---|---|
| 2012/0204042 A1* | 8/2012 | Sistla | G06F 1/3203 |
| | | | 713/320 |
| 2013/0191584 A1* | 7/2013 | Wilt | G06F 11/1645 |
| | | | 711/E12.008 |
| 2014/0189225 A1* | 7/2014 | Conrad | G06F 1/3296 |
| | | | 713/323 |
| 2017/0039125 A1* | 2/2017 | Oliverio | G06F 13/20 |
| 2019/0122132 A1* | 4/2019 | Rimini | G06Q 50/06 |
| 2019/0286971 A1* | 9/2019 | Che | G06F 11/3024 |
| 2020/0019221 A1* | 1/2020 | Jahagirdar | G06F 1/26 |
| 2020/0183476 A1 | 6/2020 | Honnavara-Prasad | |
| 2020/0201419 A1* | 6/2020 | Bikumala | G06F 1/3287 |
| 2020/0355392 A1* | 11/2020 | So | G05B 13/0265 |
| 2021/0004265 A1* | 1/2021 | Guim Bernat | H02J 4/00 |
| 2021/0125080 A1* | 4/2021 | Raz | G06N 5/01 |
| 2021/0294403 A1* | 9/2021 | Calugaru | G06F 1/28 |

* cited by examiner

600

```
Generate a plurality of control signals for a respective
voltage regulator of one or more voltage regulators in a
computing system to regulate a supply voltage of a
respective deterministic processor of one or more
deterministic processors in the computing system
605
```

↓

```
Determine an initial profile for power consumption and
performance of an algorithm executed on the respective
deterministic processor having an initial value for the supply
voltage and an initial value for a clock frequency
610
```

↓

```
Determine a target profile for power consumption and
performance of the algorithm executed on the respective
deterministic processor
615
```

↓

```
Modify the plurality of control signals based on the initial
profile and the target profile
620
```

↓

```
Execute the algorithm on the respective deterministic
processor while the supply voltage is dynamically modified
by the respective voltage regulator based on the modified
plurality of control signals
625
```

FIG. 6

POWER MANAGEMENT IN DETERMINISTIC TENSOR STREAMING PROCESSORS

CROSS-REFERENCE TO RELATED APPLICATIONS

This application claims a benefit and priority to U.S. Provisional Patent Application Ser. No. 63/081,241, filed on Sep. 21, 2020, which is hereby incorporated by reference in its entirety.

TECHNICAL FIELD

The present disclosure generally relates to power management, and more specifically to power management in a deterministic tensor streaming processor.

BACKGROUND

Computer systems, including computers used in artificial intelligence (AI) and machine learning (ML) applications, are becoming increasingly ubiquitous. Computer systems typically include one or more processors that manipulate and control the flow of data in the computer system by executing corresponding instructions.

Many AI and ML techniques require execution of power-intensive tasks. The performance of commercially available central processing units (CPUs) or graphics processing units (GPUs) may be improved by scaling their operating frequencies or supply voltages to reduce power demands. However, power and performance needs of AI/ML systems could be unpredictable because of the variations in the workloads. Thus, it may be challenging to optimize the power usage and/or performance of computer processors when executing AI and ML applications. Existing systems that manage performance needs by scaling a supply voltage and an operating clock frequency often suffer lower computational performance.

As processors perform more complicated ML tasks, power management becomes a more important issue. More efficient operation of a processor executing a ML algorithm can reduce power consumption. Voltage regulators can be used along with processors to meet fast current slew rate requirement (i.e., fast change of current over time). However, voltage regulators produce power losses which grow almost linearly with their switching frequency. Such power losses have previously caused design difficulties, performance and cost penalties in power distribution and thermal cooling.

Minimizing the power consumption for a processor-based learning model usually involves one of the following choices: (i) selection of an operating clock frequency and a supply voltage or (ii) selection of different, lower-power instructions to optimize the power consumption performance. However, both approaches incur performance penalties. For example, a faster processor requires a higher supply voltage, which produces higher power consumption.

In existing systems, power management relies on a feedback of past or current performance to determine appropriate levels for future supply voltage and/or operational frequency settings. More specifically, as instructions are executed in traditional systems, a power controller receives information about ongoing processes and uses that information to control the feedback. However, these feedback based systems cannot always correctly anticipate power consumption requirements of future tasks and may as a result make inefficient decisions regarding supply voltage and/or operational frequency settings.

SUMMARY

Embodiments of the present disclosure disclose a printed circuit board with one or more deterministic processors, each designed to support a set of operating frequencies with corresponding power supply voltages. A supported maximum clock frequency for each supply voltage can be first obtained. A machine learning (ML) algorithm is implemented on an integrated circuit that includes the deterministic processor. The ML algorithm has a power usage profile that changes during the execution of the algorithm, based on instantaneous utilization of the integrated circuit, operating clock frequency and supply voltage. Power consumption targets for the execution of the ML algorithm are defined as a single number, a power consumption profile, or as a range of allowed power consumption levels, in combination with other variables such as current transition rates (e.g., the current slew rate) and the like.

In one embodiment, a voltage regulator is implemented on the integrated circuit. The voltage regulator supplies power (i.e., voltage) to the deterministic processor and a value of a voltage output by the voltage regulator can be controlled by control values provided to the voltage regulator. The voltage regulator can have a set of response profiles (e.g., an output voltage as a function of time) with regard to a change in the control values from one value to another value. A time sequence of the voltage regulator control values can be defined. The time sequence of control values can be convolved with an impulse response of the voltage regulator to generate an output voltage profile of the voltage regulator that is supplied to the deterministic processor. The operating clock frequency of the deterministic processor is dependent on the supply voltage according to, e.g., a known relationship between power consumption and operating clock frequency. The operating clock frequency can be adjusted either through logic on the integrated circuit (e.g., at least one voltage sensor and/or at least one current sensor) that monitors values of the supply voltage over time and dynamically adjusts the operating clock frequency in accordance with the monitored values of the supply voltage, or through a deterministic method, or some other mechanism.

Unlike existing systems, which are only backward-looking as they rely on a feedback to assess power computation needs, the disclosed system is forward-looking. As an execution of a ML algorithm is a deterministic process, it is possible to align the supply voltage and operating clock frequency with precision relative to power usage expectations for future computation tasks.

In yet another embodiment, the deterministic aspect of the disclosed system enables precise power management in a data center where multiple printed circuit boards, each having multiple deterministic processors are housed in a rack. If the data center has a threshold power budget for the entire rack, each processor can be individually managed to allocate power among all the processors in the rack. Advantageously, not only is power managed to prevent the threshold power budget to be exceeded, but the quality of service (QOS) is also maintained.

In yet another embodiment, the deterministic aspect of the disclosed system is operated to manage a thermal budget for a single deterministic processor or for a rack having a plurality of circuit boards each having a plurality of such deterministic processors. If the case temperatures exceed a predetermined threshold temperature, the disclosed system can operate the deterministic processors in the rack to minimize further thermal increases.

In yet another embodiment, the disclosed system is configured to identify a sparsity of a model (e.g., a ML model) to be executed at a deterministic processor. When the sparsity of the model is identified, the model can be executed at the deterministic processor at a higher frequency because the sparsity implies that less power would be required to complete execution of the model. The system disclosed herein can boost the frequency and thereby increase the execution rate and QoS.

Embodiments of the present disclosure relate to reducing power consumption in one or more deterministic processors of a computing system. The computing system may further include one or more voltage regulators, one or more controllers and one or more power management modules. A respective controller generates a plurality of control signals for a respective voltage regulator to regulate a supply voltage of a respective deterministic processor of the one or more deterministic processors. A respective power management module determines an initial profile for power consumption and performance of an algorithm executed on the respective deterministic processor having an initial value for the supply voltage and an initial value for a clock frequency. The respective power management module further determines a target profile for power consumption and performance of the algorithm executed on the respective deterministic processor. The respective controller modifies the plurality of control signals based on the initial profile and the target profile. The respective deterministic processor executes the algorithm while the supply voltage is dynamically modified by the respective voltage regulator based on the modified plurality of control signals. The modified plurality of control signals may be programmed into the algorithm, e.g., by a compiler.

In some embodiments, the techniques described herein are incorporated in a hardware description language program, the hardware description language program comprising sets of instructions, which when executed describe the operation of a digital circuit. The hardware description language program may be stored on a non-transitory computer-readable storage medium, such as a computer memory (e.g., a data storage system).

In some other embodiments, the operations of methods described herein are executed by a computer processor in accordance with sets of instructions stored at a non-transitory computer-readable storage medium, such as a computer memory (e.g., a data storage system).

BRIEF DESCRIPTION OF THE DRAWINGS

Figure (FIG. 1 illustrates a computer system based on a tensor streaming processor (TSP) device, in accordance with some embodiments.

FIG. 6 is a flowchart of an example process for regulating power consumption in one or more deterministic processors of a computing system, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure are directed to a deterministic processor system where a supply voltage and operating clock frequency are controller such that a power consumption profile is optimized while achieving computational performance requirements.

An integrated circuit presented herein is designed to support a set of operating frequencies with corresponding power supply voltages while executing a machine learning (ML) algorithm. The ML algorithm has a power usage profile that changes during the execution of the algorithm, based on instantaneous silicon utilization, operating clock frequency and supply voltage. Power targets for the execution of the ML algorithm are defined and used to control a voltage regulator that regulates a supply voltage for a deterministic processor of the integrated circuit. A value of supply voltage that is output by the voltage regulator can be controlled by values determined by a time sequence of control signals. The control signals provided to the voltage regulator are convolved with an impulse response of the voltage regulator to generate a regulator output voltage profile that can be then supplied to the deterministic processor. The voltage regulator may feature a set of response profiles (e.g., output voltages as a function of time).

In some embodiments, the deterministic processor is a tensor streaming processor (TSP) having an architecture comprising a plurality of functional units slices, which is particularly suited for computations in hardware-accelerated ML and artificial intelligence (AI) applications. The TSP is a device that is commercially available from Groq, Inc. of Mountain View, California. For use in commerce, the GROQ TSP Node™ Accelerator Card is available as a x16 PCI-Express (PCIe) 2-slot expansion card that hosts a single GROQ Chip1™ device.

Architectural Overview

Figure 1:
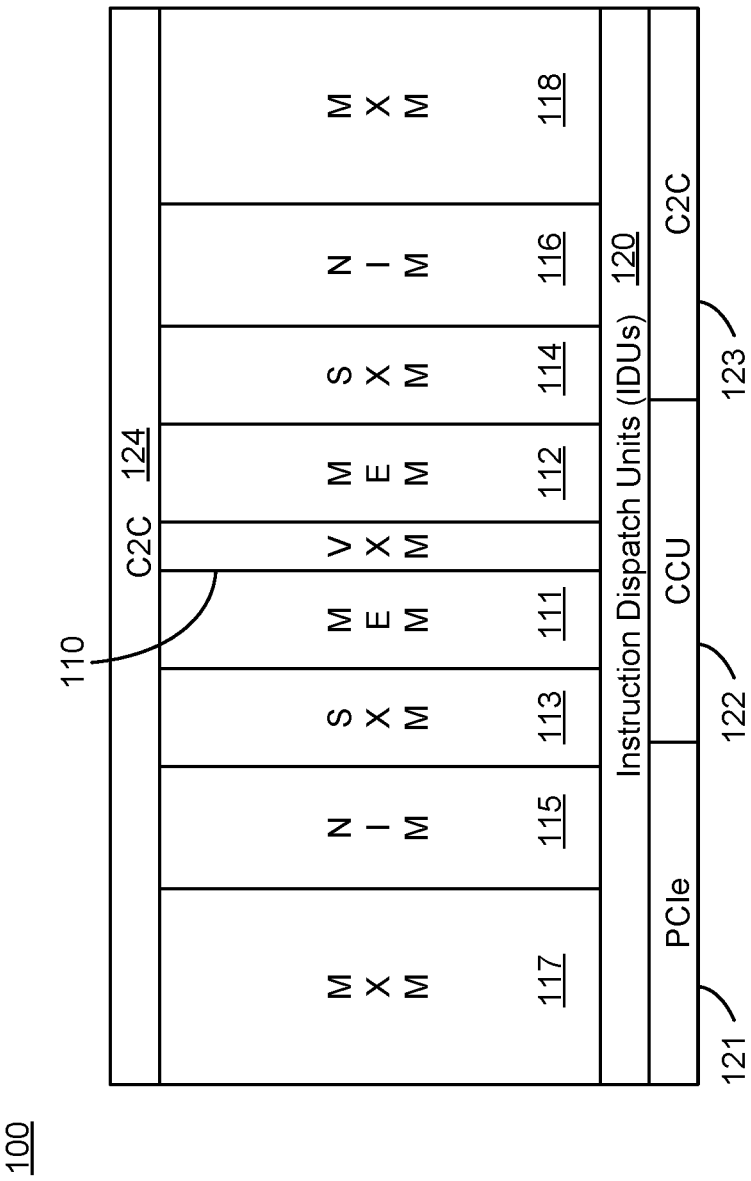

FIG. 1 illustrates an example TSP core 100, in accordance with some embodiments. The TSP core 100 (e.g., an AI processor and/or ML processor) includes memory and arithmetic modules (or functional slices) optimized for multiplying and adding input data with weight sets (e.g., trained or being trained) for AI and/or ML applications (e.g., training or inference). Each functional slice in the TSP core 100 performs any of a variety of functions under the control of instructions transferred from instruction memory buffers in instruction dispatch units (IDUs) 120. These functions include memory storage and retrieval for data in a superlane, integer arithmetic, floating point arithmetic, transferring data between superlanes, some other function, or combination thereof.

As shown in FIG. 1, the TSP core 100 includes a vector multiplication module (VXM) 110 for performing multiplication operations on vectors (i.e., one-dimensional arrays of values). For example, the VXM 110 includes 16 vector ALUs per lane arranged in groups of four ALUs. In one embodiment, the VXM 110 comprises 5,120 ALUs having 32-bit wide operands arranged in 16 lanes and 16 slices (organized in four ranks of four rows) replicated across a plurality of 20 superlanes.

Other elements of the TSP core 100 are arranged symmetrically to optimize processing speed. As illustrated in FIG. 1, the VXM 110 is directly adjacent to memory modules (i.e., MEM) 111, 112. For example, each MEM 111, 112 includes 44 functional slices comprising static random access memory (SRAM). Switch matrix units (i.e., SXM functional slices or inter-lane switches) 113 and 114 are further symmetrically arranged to control routing of data within (e.g., to perform a transpose) or between superlanes. The TSP core 100 further includes numerical interpretation modules (i.e., NIM functional slices) 115 and 116 for numeric conversion operations, and matrix multiplication units (i.e., MXM functional slices) 117 and 118 for matrix multiplications. For example, MEM functional slices perform Read and Write operations but not Add or Mul, which are only performed in the VXM and MXM functional slices. In some embodiments, MXM functional slices and NIM functional slices are combined, and may include, by way of example, 320×320 matrix units. IDUs 120 control execution of operations across all functional slices 110-118. The TSP core 100 may further include communications circuits such as chip-to-chip (C2C) circuits 123, 124 that function to couple multiple TSP devices into a single processor core, and an external communication circuit (e.g., PCIe) 121. The TSP core 100 may further include a chip control unit (CCU) 122 to control, e.g., boot operations, clock resets, some other low-level setup operations, or some combination thereof.

The TSP core 100 may support different application programming interface (API) packages. One API package employed by the TSP core 100 is an instruction API, which can be based on, e.g., Python functions that provide a conformable instruction-level TSP programming interface. Another API employed by the TSP core 100 is a tensor API, which represents a high-level application interface that supports components and tensors rather than individual instructions streaming across the TSP core 100 at particular time periods (e.g., clock cycles or compute cycles). A composite API supported by the TSP core 100 represents an API that includes both the instruction API and the tensor API.

Figure 2:
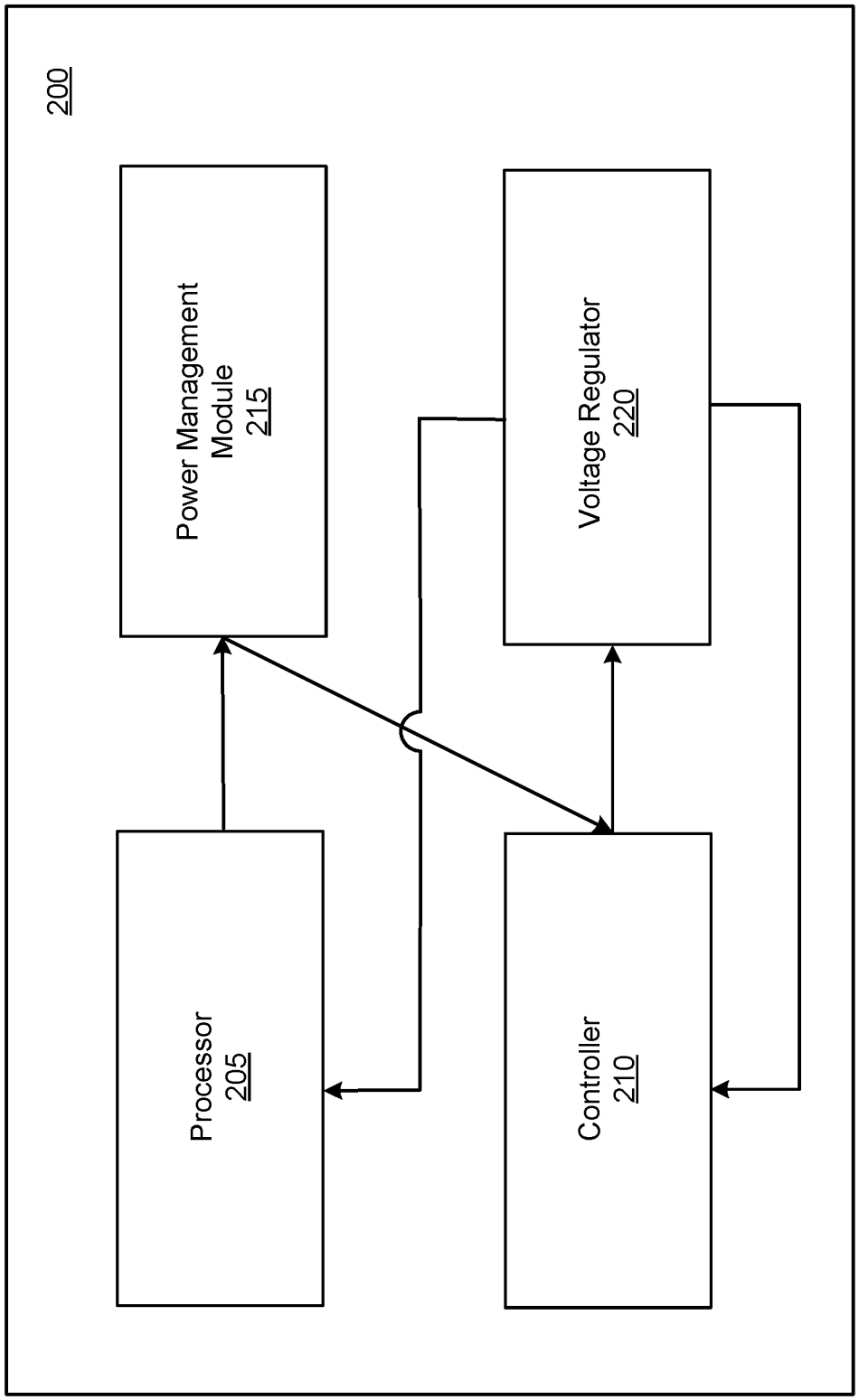
FIG. 2 illustrates a block diagram of an integrated circuit with a deterministic processor, in accordance with some embodiments.

FIG. 2 illustrates an embodiment of an integrated circuit 200, in accordance with some embodiments. The integrated circuit 200 may represent an electronic system with multiple components implemented on a chip (i.e., a system-on-chip (SoC)). The integrated circuit 200 200 may comprise a processor 205, a controller 210, a power management module 215, and a voltage regulator 220. In one embodiment, the processor 205 comprises a deterministic processor (e.g., the TSP core 100). As used herein, 'deterministic' means that the processor executes particular instructions at particular times during every execution of an algorithm (e.g., a ML algorithm). A deterministic processor may have a deterministic power consumption profile (e.g., a power consumption profile that is largely consistent across a plurality of executions of a particular algorithm, even if the inputs to the algorithm differ).

The processor 205 performs executable operations translated from an AI model. The processor 205 includes circuit blocks for performing different tasks involved in the executable operations. The processor 205 performs memory reads and/or writes, matrix multiplications, vector multiplications, data transfers, and other data transforms and manipulations. The processor 205 may be implemented on a computer chip. An example processor 205 is the TSP core 100.

The controller 210 controls operations of the voltage regulator 220. The controller 210 determines control signals for the voltage regulator 220. The control signals are configured to cause the voltage regulator 220 to produce desired output voltages for particular tasks executed by the processor 205. The desired output voltages may result in desired power consumption levels during execution of a deterministic algorithm. The controller 210 includes circuitry (e.g., one or more arithmetic logic units, matrix calculation units, and/or vector calculation units) for performing a convolution of the control signals with an impulse response of the voltage regulator 220 to produce instructions for supplying voltage to the voltage regulator 220. The controller 210 also includes circuitry to provide instructions to modify an initial clock frequency of the voltage regulator 220 and the processor 205 based on the convolution. The controller 210 supplies the instructions to the voltage regulator 220 to set the clock frequency and input voltage of the voltage regulator 220.

The power management module 215 determines a power profile for an algorithm being executed by the processor 205. Certain algorithms, including ML algorithms, are deterministic—i.e., these algorithms comprise the same sequence of operations (e.g., the same sequence of matrix multiplications) regardless of their inputs. Because the integrated circuit 200 can thus predict which tasks will be executed at which time instants, the power management module 215 can generate power consumption targets for the tasks, based on the power consumption of each task, thus generating a deterministic power/performance profile. The power management module 215 defines power consumption targets either as a single number, a power consumption profile, a range of allowed power consumption levels, a combination with other variables such as current transition rates (di/dt), some other variable or combination of variables. The power management module 215 may be a computer processor capable of determining a power consumption and performance profile of an algorithm executed on the deterministic processor 205, as well as to determine a target profile for power consumption and performance of the algorithm executed on the deterministic processor 205.

The voltage regulator 220 regulates a supply voltage of the processor 205 which enables the processor 205 to execute ML instructions. In some embodiments, the voltage regulator 220 comprises simple electronic components, such as resistors and diodes.

The method disclosed herein implements a deterministic power/performance profile when executing ML algorithms on the processor 205. For a deterministic system, it is possible to control not only voltage and frequency but also control task scheduling and memory management in the machine at the same time. It, thus, adds a third variable that leverages the known runtime information to come up with a much more efficient power profile.

Embodiments disclosed herein relate to a method for determining how instructions would behave in the future and adjust the power accordingly for the most efficient use of power while achieving high computational throughput. More specifically, the power management module 215 incorporates a unique way of changing supply voltage and operating clock frequency while managing which instructions are executed at the processor 205 to ensure that such instructions execute more efficiently. Further, the techniques presented herein enable minimization of the energy used by the processor 205.

In one or more embodiments, the deterministic aspect of the integrated circuit 200 presented herein enables precise power management in, e.g., a data center where multiple printed circuit boards (PCBs) each having multiple deterministic processors 205 housed in a rack. Each data center may contain thousands of such racks so the power requirements for such data centers can be immense. If the data center features a threshold power budget for an entire rack, each deterministic processor 205 can be individually managed to allocate power among all the deterministic processors 205 in the rack. Advantageously, not only is power managed to prevent the threshold power budget to be exceeded, but the quality of service (QOS) across each deterministic processor 205 in the rack is also maintained.

At least one deterministic processor 205 in the rack may have a very demanding QoS and would have to exceed its threshold power consumption during predetermined time periods. In such case, operations of other deterministic processors 205 in the rack may be throttled so that the overall power budget for the entire rack does not exceed the threshold power budget.

For example, the data center can include a rack having multiple chips (i.e., integrated circuits 200) mounted on one or more stacks of PCBs, each PCB including one or more deterministic processors 205. Each deterministic processors 205 in the rack can be implemented as a TSP that runs a corresponding model (e.g., a ML model). Thus, multiple models can be executed asynchronously across the multiple chips (i.e., multiple integrated circuits 200) in the rack. A subset of the deterministic processors 205 in the rack may feature predetermined time periods when the deterministic processors 205 in the subset would have to accelerate their operations when running corresponding models, which would increase power consumption in the subset of deterministic processors 205. To achieve that the overall power budget of the rack never exceeds the threshold power budget, operations of remaining deterministic processors 205 in the rack may be throttled during these predetermined time periods, i.e., operations of the remaining deterministic processors 205 in the rack may be controlled (e.g., via corresponding controllers 210 and/or voltage regulators 220) to deaccelerate when running their portions of models. Furthermore, the rack may include a central controller that controls (e.g., via a compiler running on the central controller) operations of each deterministic processor 205 in the rack, e.g., by accelerating operations of the deterministic processors 205 during the predetermined time periods and deaccelerating the remaining deterministic processors 205 in the rack so that the overall power budget of the rack never exceeds the threshold power budget.

In one or more other embodiments, the deterministic aspect of the integrated circuit 200 presented herein can be exploited to manage a thermal budget for a single deterministic processor 205 or for a rack of multiple PCBs with multiple deterministic processors 205 each running a respective model. If an overall temperature in the rack exceeds a predetermined threshold temperature, operation of each deterministic processors 205 in the rack may be controlled (e.g., via a corresponding controller 210 and/or corresponding voltage regulator 220) such that further thermal increases are minimized. To control the overall temperature in the rack, the same process described above for controlling the overall power budget in the rack can be employed to keep the overall temperature in the rack below the threshold temperature.

In one or more other embodiments, the integrated circuit 200 presented herein is configured to identify a sparsity of a model (e.g., a ML model) that is being executed at the deterministic processor 205. When the sparsity of the model is identified, the model can be executed at the deterministic processor 205 at a higher frequency because the sparsity implies that less power would be required to complete execution of the model. The integrated circuit 200 may be configured to boost a clock frequency (e.g., via the controller 210 and/or the voltage regulator 220) and thereby increase the execution rate and the QoS at the deterministic processor 205. In an embodiment, the model can be implemented and executed at the deterministic processor 205 as a composition of two models, i.e., a "normal sub-model" (e.g., a portion of the model with weights above a defined threshold weight) and a "sparse sub-model" (e.g., a portion of the model with weights below a defined threshold weight). In such case, the sparse sub-model can be executed by the deterministic processor 205 at a higher clock frequency compared to the normal sub-model. When running the sparse sub-model, the deterministic processor 205 still receives an instruction flow, but because the weights are known to be very small (e.g., equal to zero or close to zero within the defined threshold weight), the controller 210 (and/or the voltage regulator 220) can be configured to control operation of the deterministic processor 205 such that the consumed power is no more than a portion (e.g., between 20% to 40%) of the power consumed by each compute engine of the deterministic processor 205 executing instructions of the normal sub-model. Since the power savings is known, the QoS may be improved by executing the sparse sub-model at a higher frequency and/or voltage.

Figure 3:
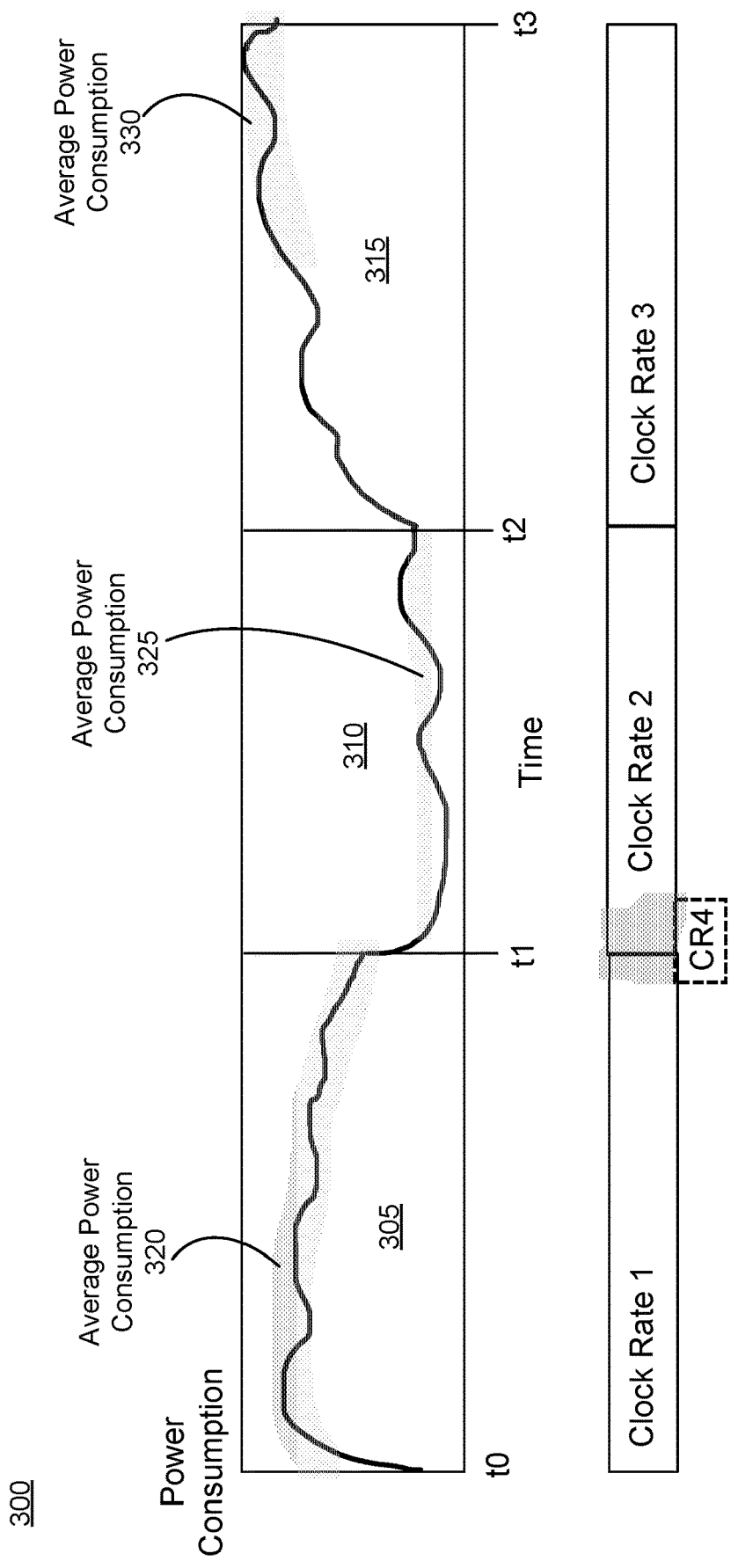
FIG. 3 shows an example power consumption profile over multiple time segments during operation of the electronic system in FIG. 2, in accordance with some embodiments.

FIG. 3 shows an example power profile 300 over a plurality of time segments during operation of integrated circuit 200. The power profile 300 comprises a first time segment 305, a second time segment 310, and a third time segment 315. Each time segment 305-315 has a corresponding clock rate and a corresponding average power consumption. An average power consumption 320 (e.g., P1) in the first time segment 305 is greater than an average power consumption 325 (e.g. P2) in the second time segment 310, indicating that the integrated circuit 200 uses more resources during the first time segment 305 than during the second time segment 310. In the third time segment 315, the power consumption of the integrated circuit 200 is ramping up, i.e., an average power consumption 330 (e.g., P3) in the third time segment 315 is again greater than the average power consumption 325 (e.g., P2) in the second time segment 310.

The power profile 300 includes power generated by the integrated circuit 200 from when the integrated circuit 200 is initiated until the integrated circuit 200 enters either a quiescent state of minimal power over an extended time period, e.g., a sleep mode, or execution of instructions ceases and power is turned off. Although the power consumptions P1, P2 and P3 are shown having specific average power consumption levels, the average power consumption level for any time segment would depend on the particular ML algorithm being executed, the processor 205 performing the ML algorithm and other engineering considerations and constraints. Further, although there are many peaks and valleys as well as instantaneous spikes or transients in both positive and negative directions, such waveform features shown in FIG. 3 are merely for the purpose of illustration.

Example Process—Determining Supply Voltage

Figure 4:
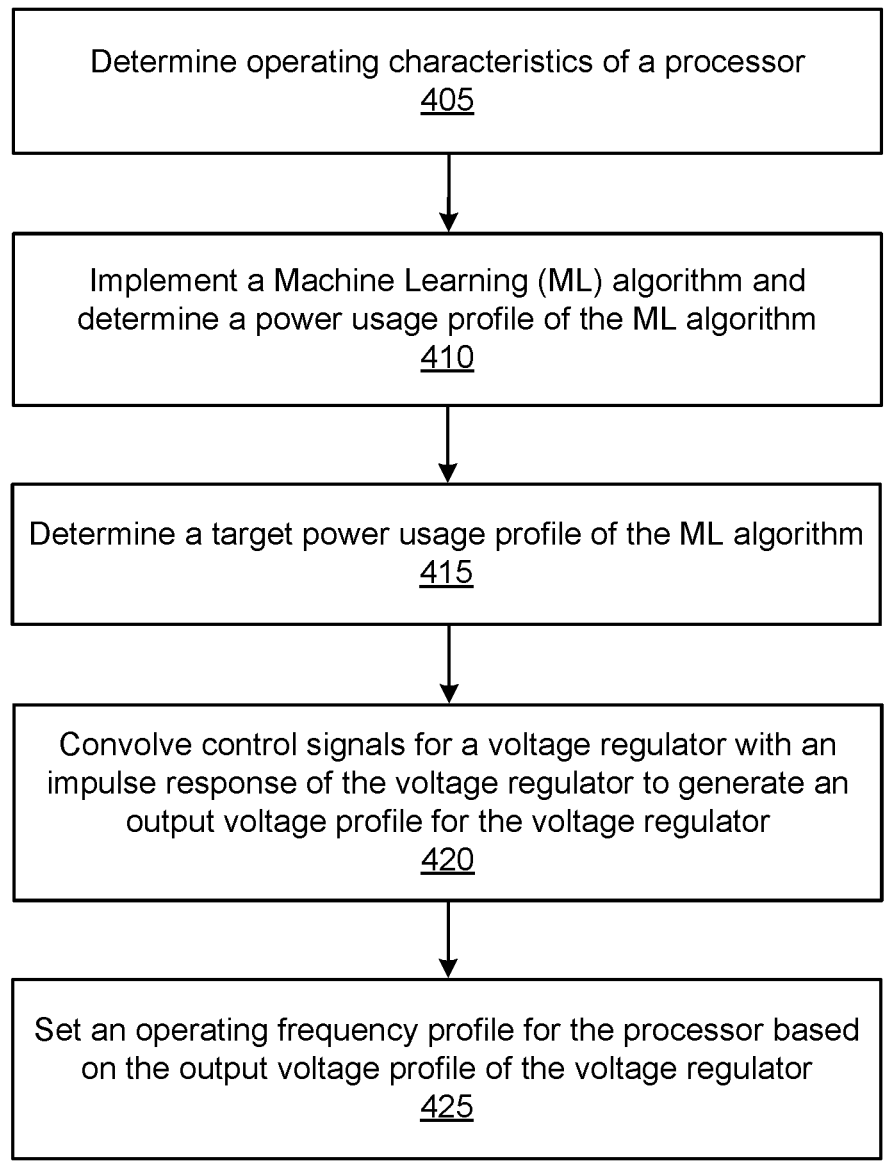
FIG. 4 is a flowchart of an example process for determining a supply voltage and operating clock frequency of the deterministic processor of the electronic system in FIG. 2, in accordance with some embodiments.

FIG. 4 is a flowchart of an example process 400 for determining the supply voltage and operating clock frequency of the processor 205, in accordance with some embodiments. The process 400 can be performed by the integrated circuit 200, e.g., by the processor 205, the controller 210, the power management module 215, and/or the voltage regulator 220.

At 405, the integrated circuit 200 determines (e.g., via the controller module 203 and the power management module 215) operating characteristics of the processor 205. More specifically, at 405, the integrated circuit 200 determines a maximum clock frequency for each supply voltage of the processor 205. At 410, the integrated circuit 200 implements (e.g., via the processor 205) a ML algorithm, and the integrated circuit 200 determines (e.g., via the power management module 215) a power usage profile of the ML algorithm. The power usage profile may be determined based on instantaneous silicon utilization, which includes information about instructions being executed, operating clock frequency and supply voltage. The power usage profile may correspond to the power usage profile 300 shown in FIG. 3.

At 415, the integrated circuit 200 determines (e.g., via the power management module 215) a target power usage profile for execution of the ML algorithm, which may be expressed as a single number, a power consumption profile, or as a range of allowed power consumption levels, in combination with other variables such as current transition rates and the like. As compared to the power usage profile determined at 410, the target power consumption profile may comprise reduced power consumption levels during certain time periods of execution of the ML algorithm.

The voltage regulator 220 supplies the power to the integrated circuit 200 and the value of the supply voltage is controlled by values specified by control signals driven into the voltage regulator 220 by the controller 210. The voltage regulator 220 has a set of impulse responses (i.e., output voltages as a function of time) with regards to a change in the control values from one value to another value. A time sequence of regulator control values is thus defined which is dependent on the work to be performed. The controller 210 may use the target power usage profile to generate a time sequence of control signals for the voltage regulator 220.

At 420, the integrated circuit 200 convolves (e.g., via dedicated circuitry of the controller 210 and/or the voltage regulator 220) the control signals with the impulse response of the voltage regulator 220 to generate an output voltage profile for the voltage regulator 220 that is supplied to the processor 205.

At 425, the integrated circuit 200 sets (e.g., via the voltage regulator 220 or some other circuit of the integrated circuit 200) an operating clock frequency profile for the processor 205 based on, e.g., the output voltage profile of the voltage regulator 220. The operating clock frequency of the processor 205 may be dependent on the supply voltage according to, e.g., a general relationship between the supply voltage and operating clock frequency. As the supply voltage decreases, the operating clock frequency also decreases. In some embodiments, the relationship between the supply voltage and the operating clock frequency is a multiplicative inverse relationship, where at higher voltages, clock frequency is not affected much as voltage drops, but at lower voltages, clock frequency is significantly affected as voltage drops. The operating clock frequency of the processor 205 may be dynamically adjusted over time through the voltage regulator 220 or some other circuit of the integrated circuit 200 that measures the value of the supply voltage and adjusts the operating clock frequency accordingly. Alternatively, the operating clock frequency of the processor 205 may be dynamically adjusted over time through a defined deterministic process (e.g., executed by the controller 210), or some other mechanism.

In some embodiments, the integrated circuit 200 is configured to modify the operating clock frequency of the processor 205 such that a clock of the integrated circuit 200 is stopped during a transition in supply voltage, the clock adjusts with the changing supply voltage in a continuous manner, or by some other method. The integrated circuit 200 may be configured to combine the clock frequency information and supply voltage information with the ML algorithm characteristics to generate performance data and a power profile for the execution of the ML algorithm. The integrated circuit 200 selects among multiple methods to optimize the time-sequence to meet target performance and power profile requirements. One example method is to minimize the execution time of the ML algorithm within the power profile requirements. One other example is to minimize the average power for a set execution time. The integrated circuit 200 embeds (e.g., encodes) the optimized time sequence of regulator control values in a program executing the ML algorithm on the processor 205. The same methodology can be implemented with on-chip power regulators, with on-package regulators, with on-board regulators, or other power supply options.

When minimizing the power consumption for a ML algorithm executed on a processor-based computer system, two approaches are commonly available—(i) selection of an appropriate operating clock frequency and a supply voltage or (ii) selection of different, lower power instructions for optimization of power performance. Both approaches incur a performance penalty when a competing goal is to optimize the performance of the processor-based computer system. The faster the processor-based computer system needs to run, the higher the supply voltage is that needs to be provided, which results in a higher power consumption. On the other hand, managing the power consumption in the processor-based computer system by controlling its supply voltage and operating clock frequency may result into applications running at the processor-based computer system that suffer from a lack of computational performance.

The integrated circuit 200 presented herein enables the power consumption to be optimally set for every clock cycle using appropriate guard banding for voltage regulator slew time. For example, as illustrated in FIG. 3, a clock rate CR4 is selected for a short period of time corresponding to portions of the time segments 305 and 310, e.g., for a time period of approximately 0.5 to 5.0 nanoseconds. In one embodiment, the clock rate CR4 represents a minimum clock rate for the integrated circuit 200. In another embodiment, the clock rate CR4 is a zero clock rate. This period of low clock frequency corresponds to a time period during which the voltage regulator 220 slews from a high-power state to a very low power state in a very short time period. By pausing operations or gradually ramping the operating clock frequency from a high rate to a very low rate, the operation of the integrated circuit 200 is not dependent on the response rate of the voltage regulator 220.

Management of power consumption can be crucial for efficient operations of silicon-based computer systems. Current silicon-based computer systems are generally constrained so that power consumption is not higher than between, e.g., approximately 75 W and 300 W due to current cooling capabilities and thermal management resources. The present disclosure enables three variables of power consumption control: (i) voltage, (ii) frequency, and (iii) enabling tasks to be executed at power levels under a defined threshold power level (e.g., 75 W).

In accordance with embodiments of the present disclosure, the integrated circuit 200 operating as a deterministic processor-based computer system anticipates future processing tasks prior to execution of these tasks. Accordingly, the integrated circuit 200 can adjust the supply voltage ahead of time in order to maintain an optimal level of processing tasks performed during a defined time interval. More specifically, the power management module 215 is aware of the coming workload and is configured to adjust the power supply voltage in anticipation of the need of different power supply levels. Adjusting the voltage regulation nearly instantaneously may lead to program faults and increase the length of time to complete processing tasks because power supplies do not change power from one level to another in an instantaneous manner. Advantageously, in accordance with embodiments of the present disclosure, the power management module 215 is configured to send appropriate control information to the voltage regulator 220 on the processor-based system circuit board, wherein the voltage regulator 220 has its own time constant, and therefore the power supply change is not immediate. One key advantage of the presented approach for power management at the integrated circuit 200 is that the power management does not rely on instantaneous local optimization, i.e., the integrated circuit 200 is configured to look ahead and correct faults before they occur. In some embodiments, the integrated circuit 200 reduces the operating clock frequency during a high-power sequence of processing tasks performed at the processor 205 and/or increases the operating clock frequency of a low-power sequence of tasks performed at the processor 205, e.g., to boost efficiency and reduce energy costs.

For the integrated circuit 200 operating as a deterministic processor-based computer system, the workload, the schedule of tasks to be executed, and the response of the voltage regulator 220 are known in advance. Thus, the system behavior information can be combined with the behavior information for the voltage regulator 220 to devise a method that optimizes power consumption for a given workload in view of any performance mandate. Transient behavior that lasts for a time period shorter than a threshold time period (e.g., a few nanoseconds) can be ignored because the response behavior of the voltage regulator 220 takes, e.g., about a microsecond to change to a new voltage. Thus, if the ML algorithm being executed on the deterministic processor 205 requires a first power level for a first time period having a first duration (e.g., about 200 nanoseconds) followed by a second power level for a second time period having a second duration (e.g., about 100 nanoseconds), the controller 210 instructs the voltage regulator 220 to gradually adjust a power (voltage) supply level at the processor 205 from the first power level to the second power level during transition from the first time period to the second time period so that the power level is optimized around the transition time. The power level is adjusted based at least in part on the power profile of the ML algorithm being implemented. Advantageously, it is possible to create a ML algorithm that looks multiple microseconds ahead of time and starts to adjust an output of the voltage regulator 220 in a correct direction so that by the time the workload is ready for execution, the voltage regulator 220 is in the appropriate state of voltage regulation.

For example, the average power consumption during a first time period of operation at the processor 205 can be set at 75 W+/−10%, and, at some point in time, the power consumption demand at the processor 205 would drop to 50 W. The controller 210 sends instructions (i.e., control signals) to the voltage regulator 220 to maintain the 75 W power level at the processor 205 until approximately 0.7 or 0.8 nanoseconds before the transition, when the controller 210 sends additional instructions (i.e., additional control signals) to the voltage regulator 220 to initiate transition to 50 W average power consumption at the processor 205. Thus, at about the time when the power consumption demand drops during the second time period, the voltage regulator 220 may rapidly approach the new average power consumption level of 50 W.

In one embodiment, an average power consumption level may be specified (e.g., 75 W), and the integrated circuit 200 achieves that average power consumption level by managing an operating clock frequency of the processor 205. In another embodiment, a nominal power target may be varied such that higher performance is achieved for a predictable power level. For the integrated circuit 200 that represents a deterministic processor-based computer system, it is known for every clock cycle exactly when each instruction of ML algorithm running on the deterministic processor 205 would execute and how much energy each instruction would require in order to execute. If too many instructions are queued for execution, the processor 205 may be instructed to delay execution of a set of instructions or to execute the set of instructions at a lower clock frequency.

Note that the deterministic processor 205 does not possess caching mechanisms and does not have memory access uncertainty, which enables the processor 205 to perform task scheduling in advance. In traditional central processing unit (CPU) and graphics processing unit (GPU) based systems where a program or a binary is executing, the task scheduling cannot be done in advance. In the present disclosure, a compiler associated with the processor 205 can provides a complete task scheduling, so each instruction executed at the processor 205 can be placed exactly where its producer and consumer are ready to operate.

In some embodiments, the integrated circuit 200 operating as the deterministic processor-based system provides an application programming interface (API) that allows access to the hardware without going through the compiler. In such embodiments, the API expects a set of instructions to define the proper scheduling. For example, for an Add function, the instructions are spaced where a producer and a consumer are at particular time shifts. In one embodiment, a unified scheduler takes an instruction sequence and the unified scheduler performs the entire scheduling and hardware access.

Example Process—Supplying Control Instructions

Figure 5:
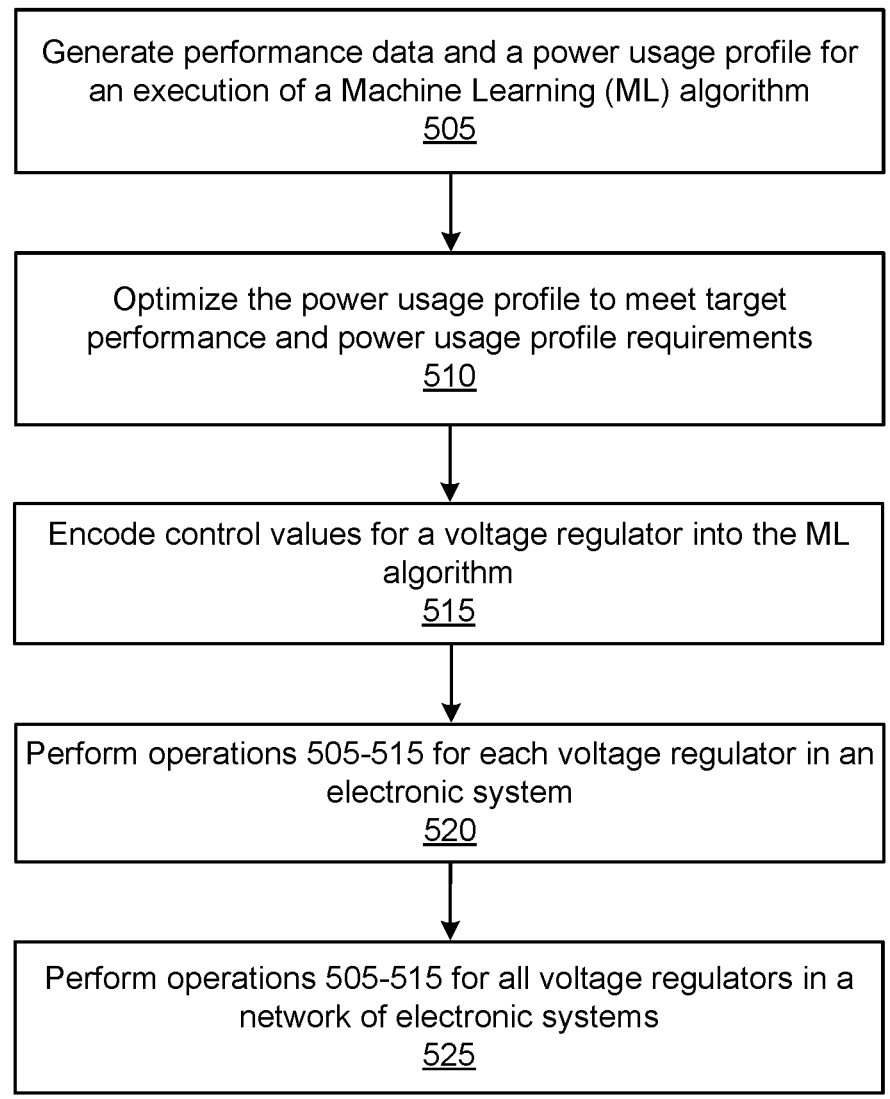
FIG. 5 is a flowchart of an example process for supplying control instructions to at least one voltage regulator of the electronic system in FIG. 2, in accordance with some embodiments.

FIG. 5 is a flowchart of an example process 500 for supplying control instructions to one or more voltage regulators of an electronic system, in accordance with some embodiments. The process 500 can be performed by the integrated circuit 200, i.e., by one or more components of integrated circuit 200 (e.g., by the power management module 215 and/or the controller 210 that provide control instructions for the voltage regulator 220). The process 500 may follow the process 400 in FIG. 4.

At 505, the integrated circuit 200 generates (e.g., via the power management module 215) performance data and a power usage profile for execution of a ML algorithm. Note that the ML may be executed by the processor 205 at an operating clock frequency and a supply voltage that are set at step 425 of the process 400.

At 510, the integrated circuit 200 optimizes (e.g., via the power management module 215) the power usage profile to meet both performance and target power usage profile requirements. Such optimization can be achieved by repeating operations 405 to 505. In one embodiment, an execution time of the ML algorithm is minimized within the power profile requirements of the processor 205. In another embodiment, the average power consumption is minimized for a defined execution time of the ML algorithm.

At 515, the integrated circuit 200 encodes (e.g., via the compiler or the controller 210) the optimized time-sequence of regulator control values into a program of the ML algorithm. The regulator control values may control output voltage levels of the voltage regulator 220 that are provided to the processor 205 during execution of the ML algorithm, thus achieving optimized power usage profile at the processor 205.

Operations 505-515 can be performed for each voltage regulator of the electronic system, as indicated at 520. The operations of processes 400 and 500 in FIGS. 4-5, when implemented with on-chip power regulators, can also be implemented with on-package regulators, with on-board regulators, or other power supply options. The operations of processes 400 and 500 in FIGS. 4-5 can be further extended across multiple voltage regulators concurrently. These multiple voltage regulators can supply power within the same chip, or across multiple chips within a network of electronic system, as indicated at 525.

As a temperature is a direct function of power consumption, the approach presented herein for optimizing the power usage profile at the processor 205 also enables accurate thermal control in stacked chips (e.g., three-dimensional stack of chips) through careful management of temperature at each chip and temperature differences between each chip in the stack. In this manner, reduction of temperature spikes during operations of the stacked chips can be substantially mitigated or completely avoided.

With the disclosed integrated circuit 200, a customer running a ML algorithm on the deterministic processor 205 can define a fixed power consumption target or a floating power consumption target. For example, the floating power consumption target can be specified as 75 W+10%. Alternatively, the floating power consumption target can be selected from several different power profiles.

In a typical configuration of the integrated circuit 200, the voltage regulator 220 is placed on a circuit board and supplies the voltage to power up the processor 205 or a system comprising multiple processors (e.g., multiple identical processors 205) placed on the same circuit board. The voltage regulator 220 has a response profile, and thus the power output does not change instantaneously from one voltage to another. The sequence of control values provided by the controller 210 and the properties of the voltage regulator 220 determine how fast the output changes. The integrated circuit 200 can determine (e.g., via the power management module 215) the optimal time sequence of control values to provide to the voltage regulator 220 to achieve the power needs of the processor 205 for a particular time sequence.

Once the integrated circuit 200 ascertains the response from the voltage regulator 220, it is possible to run an optimization loop to create an output voltage profile for the voltage regulator 220. The operating clock frequency of the processor 205 is dependent on the output voltage profile such that the processor 205 runs faster when the supply voltage is higher and slower when the supply voltage is lower to minimize power dissipation. Levels of supply voltages output by the voltage regulator 220 are dynamically adjusted based on the sequence of control values provided by the controller 210 at an input of the voltage regulator 220. Advantageously, it is possible to adjust a clock frequency of the processor 205 and/or a clock frequency of the integrated circuit 200 with different approaches to maintain an operating clock frequency at the processor 205 running a ML algorithm such that the operating clock frequency remains dependent on the supply voltage provided by the voltage regulator 220. The mechanism of linking the operating clock frequency of the processor 205 to the voltage output of the voltage regulator 220 represents the first level of power optimization. Additionally, at the second level of power optimization, the ML algorithm is linked and optimized such that the time sequence of control values controlling operation of the voltage regulator 220 is embedded into a corresponding program of the ML algorithm, e.g., by the compiler.

In some embodiments, multiple circuit boards each including an integrated circuit 200 operating as a deterministic processor-based system can be mutually interfaced, e.g., in a network of deterministic processor-based systems. In such cases, the sequence of control values controlling operations of the voltage regulators across different circuit boards can be programmed to deterministically adjust the power consumption for all deterministic processors across different circuit boards. Optimization of power consumption at deterministic processors across different circuit boards can be further achieved by acquiring information about the use of power at various times throughout the execution of ML algorithms running on the deterministic processors.

Process Flow

FIG. 6 is a flowchart illustrating a method 600 of regulating power consumption in one or more deterministic processor of a computing system, in accordance with some embodiments. Operations of the method 600 may be performed by the components of the computing system (e.g., components of the integrated circuit 200 in FIG. 2). In some embodiments, the computing system is the integrated circuit 200. In some other embodiments, the computing system comprises multiple integrated circuits 200 mounted on multiple PCBs as part of a rack (e.g., of a data center). The one or more deterministic processors can be part of the computing system that further includes at least one computer processor (e.g., a host server) and a non-transitory computer-readable storage medium for storing computer executable instructions. Each of the one or more deterministic processors may be the TSP core 100 in FIG. 1. The method 600 may be initiated by a compiler operating on the at least one computer processor. The compiler may utilize as its input a model (e.g., a ML model) for the at least one computer processor and outputs instructions for configuring operation of the at least one computer processor.

The computing system generates 605 (e.g., via the controller 210) a plurality of control signals for a respective voltage regulator (e.g., the voltage regulator 220) of one or more voltage regulators in the computing system to regulate a supply voltage of a respective deterministic processor (e.g., the processor 205) of the one or more deterministic processors. The plurality of control signals may comprise a time sequence that controls an operation of the respective voltage regulator.

The computing system determines 610 (e.g., via the power management module 215) an initial profile for power consumption and performance of an algorithm executed on the respective deterministic processor having an initial value for the supply voltage and an initial value for a clock frequency. The algorithm may be a ML algorithm. The respective deterministic processor may comprise, among other functional unit, at least one array of vector multiplication functional units, memory functional units, and/or matrix multiplication functional units configured to execute the algorithm (e.g., the ML algorithm).

The computing system determines 615 (e.g., via the power management module 215) a target profile for power consumption and performance of the algorithm executed on the respective deterministic processor. The computing system determines the target profile by determining at least one target power consumption. The at least one target power consumption may comprise a single power consumption level or a range of power consumption levels. The target profile may comprise at least a first power consumption level and a second power consumption level. The target profile may further comprise information about a transition from the first power consumption level to the second power consumption level, wherein the transition may be gradual. The target profile may be associated with a power consumption of the respective deterministic processor below a power consumption threshold level for a predefined execution time of the algorithm executed on the respective deterministic processor.

The computing system modifies 620 (e.g., via the controller 210) the plurality of control signals based on the initial profile and the target profile. The computing system may convolve (e.g., via the controller 210) the modified control signals with an impulse response of the respective voltage regulator to generate a voltage profile. The impulse response may comprise an output voltage of the respective voltage regulator as a function of time. The computing system may provide (e.g., via the voltage regulator 220) the supply voltage to the respective deterministic processor during the execution of the algorithm in accordance with the generated voltage profile. The computing system may instruct (e.g., via the controller 210), based on the generated voltage profile, the respective voltage regulator to dynamically modify the clock frequency of the respective deterministic processor during the execution of the algorithm. The generated voltage profile and the dynamically modified clock frequency satisfies the target profile for each of the one or more deterministic processors.

The computing system executes 625 (e.g., via the processor 205) the algorithm while the supply voltage is dynamically modified by the respective voltage regulator based on the modified plurality of control signals. In some embodiments, the modified plurality of control signals is programmed into the algorithm. For example, the modified plurality of control signals can be embedded (e.g., via a compiler associated with the computing system and/or the one or more deterministic processors) into a program executing the algorithm on the respective deterministic processor.

In some embodiments, the computing system monitors over time (e.g., via a circuit coupled to the voltage regulator 220, not shown in FIG. 2) values of the supply voltage dynamically modified during the execution of the algorithm. In such cases, the integrated circuit dynamically modify (e.g., via the circuit or by instructing the voltage regulator 220) an operating clock frequency of the respective deterministic processor during the execution of the algorithm based on the monitored values of the supply voltage. The circuit may be implemented as a voltage sensor circuit, a current sensor circuit, or some other circuit capable of monitoring values of the supply voltage over time and generate appropriate command signals for modifying the operating clock frequency based on the monitored values of the supply voltage. In some embodiments, each deterministic processor of the one or more deterministic processors is individually managed to allocate a power over time such that a threshold power for the one or more deterministic processors is not exceeded, while a QoS is maintained for one or more models executing on the one or more deterministic processors.

Additional Configuration Information

Figure 7:
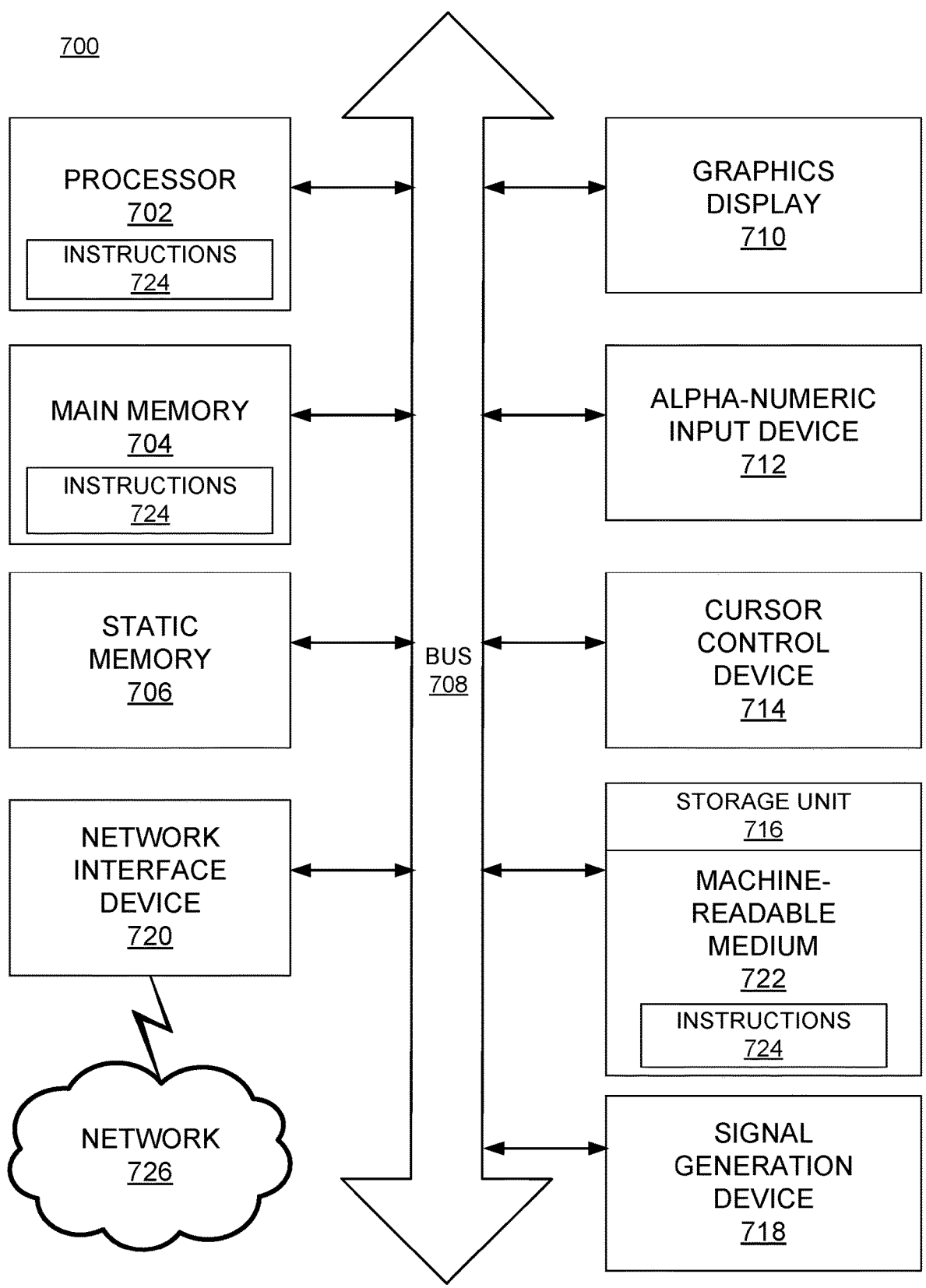
FIG. 7 illustrates a computing machine for use in commerce, in accordance with some embodiments.

FIG. 7 is a block diagram illustrating components of an example computing machine that is capable of reading instructions from a computer-readable medium and executing them in a processor (or controller) according to an embodiment. A computer described herein may include a single computing machine shown in FIG. 7, a virtual machine, a distributed computing system that includes multiple nodes of computing machines shown in FIG. 7, or any other suitable arrangement of computing devices. The computer described herein may be used by any of the elements described in the previous figures to execute the described functions.

By way of example, FIG. 7 depicts a diagrammatic representation of a computing machine in the example form of a computer system 700 within which instructions 724 (e.g., software, program code, or machine code), which may be stored in a computer-readable medium, causing the machine to perform any one or more of the processes discussed herein. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment The structure of a computing machine described in FIG. 7 may correspond to any software, hardware, or combined components shown in the figures above. By way of example, a computing machine may be a TSP designed and manufactured by Groq, Inc. of Mountain View, California, a personal computer (PC), a tablet PC, a set-top box (STB), a personal digital assistant (PDA), a cellular telephone, a smartphone, a web appliance, a network router, an internet of things (IOT) device, a switch or bridge, or any machine capable of executing instructions 724 that specify actions to be taken by that machine. Further, while only a single machine is illustrated, the term "machine" shall also be taken to include any collection of machines that individually or jointly execute instructions 724 to perform any one or more of the methodologies discussed herein In one embodiment, the computing machine is configured as the computer system 700 to function as a host machine where one or more machine learning models are stored as a series of instructions. Upon receipt of a request, a selected model or a plurality of models are transferred from the host machine to another computing machine, which in a preferred embodiment is one or more TSPs. Upon receipt of the model, the TSP then executes the model and returns a result, which may be an inference based upon the execution of the model and the supplied operands.

The example computer system 700 includes one or more processors (generally, a processor 702) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a computer-readable medium 722 on which the instructions 724 are stored embodying any one or more of the methodologies or functions described herein. The instructions 724 may also reside, completely or at least partially, within the main memory 704 or within the processor 702 (e.g., within a processor's cache memory). Thus, during execution thereof by the computer system 700, the main memory 704 and the processor 702 may also constitute computer-readable media. The instructions 724 may be transmitted or received over a network 726 via the network interface device 720.

While the computer-readable medium 722 is shown in an example embodiment to be a single medium, the term "computer-readable medium" should be taken to include a single medium or multiple media (e.g., a centralized or distributed database, or associated caches and servers) able to store instructions (e.g., the instructions 724). The computer-readable medium 722 may include any medium that is capable of storing instructions (e.g., the instructions 724) for execution by the machine and that cause the machine to perform any one or more of the methodologies disclosed herein. The computer-readable medium 722 may include, but not be limited to, data repositories in the form of solid-state memories, optical media, and magnetic media. The computer-readable medium 722 does not include a transitory medium such as a signal or a carrier wave.

The disclosed configurations may have benefits and advantages that include, for example, a more efficient data flow by separating the functions of the processor into specialized functional units, and configuring the timing of data and instructions to each functional unit, such that each unit is able operate on received data based upon a known timing between received data and instructions. Because the compiler for the processor is hardware aware, it is able to configure an explicit plan for the processor indicating how and when instructions and data operands are transmitted to different tiles of the processor. By accounting for the timing of received instructions and data, the data can be transmitted between the tiles of the processor without unnecessary metadata, increasing an efficiency of the transmission. In addition, by separating the transmission of data and instructions, instructions can be iterated and looped independent of received data operands.

In addition, because each tile of the processor is dedicated to a specific function (e.g., MEM, VXM, MXM, SXM), instructions processed by the tiles may be executed repeatedly over one, two or several clock cycles until replaced by a next instruction. Certain tiles (e.g., MXM) may be configured to perform a limited set of operations on any received data. By way of example, the MXM may receive a first instruction to multiply operands and that instruction may be executed by one or more multipliers in the MXM. When a second instruction is received at the MXM, the MXM may be configured to multiply the operands and accumulate the results in an accumulator. As such, these tiles may be able to operate without having to receive explicit instructions or only receiving intermittent or limited instructions, thereby simplifying operation of the processor and reducing power consumption. Similarly, data operands read from memory can be intercepted by multiple functional slices as the data is transmitted across a data lane, allowing for multiple operations to be performed on the data in a more efficient manner.

In operation, a host computer programs a direct memory access (DMA) engine to actually transfer data, again all of which is coordinated by the runtime layer. Specifically, the IDU transfers 320-byte vectors from PCIe-Gen4 at a rate of 32-bytes every core-clock cycle (e.g., nominally 900 Mhz). Thus, the 320-element vector arrives over a period of 10 cycles and placed on multiple streams moving towards the MEM. The incoming streams flow on S24-31 (upper eight streams), from which the MEM performs a "write" to commit that vector to SRAM. Hence, a PCI-Receive consists of (i) receiving the data from the PCI interface, and (ii) writing the vector into the specified functional slice of the MEM.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments of the present disclosure may further relate to a system comprising a processor (e.g., a tensor streaming processor or an artificial intelligence processor), at least one computer processor (e.g., a host server), and a non-transitory computer-readable storage medium. The storage medium can store computer executable instructions, which when executed by the compiler operating on the at least one computer processor, cause the at least one computer processor to be operable for performing the operations and techniques described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computing system comprising:
    a deterministic processor that operates at a selected clock frequency, wherein the deterministic processor is configured to execute defined instructions at defined times during each execution of an algorithm;
    a voltage regulator configured to regulate a supply voltage for the deterministic processor;
    a controller configured to generate a plurality of control signals for the voltage regulator to regulate the supply voltage for the deterministic processor; and
    a power management module configured to:
        determine an initial profile for power consumption and performance of the algorithm executed on the deterministic processor having an initial value for the supply voltage and an initial value for the clock frequency, and
        determine a target profile for power consumption and performance of each execution of the algorithm on the deterministic processor based on the defined instructions scheduled to be executed,
    the controller further configured to dynamically modify the plurality of control signals based on the initial profile and the target profile, and
    the deterministic processor is configured to execute the algorithm while the supply voltage is dynamically modified by the voltage regulator based on the modified plurality of control signals.

2. The computing system of claim 1, wherein:
    the controller is further configured to convolve the modified control signals with an impulse response of the voltage regulator to generate a voltage profile; and
    the voltage regulator is further configured to provide the supply voltage to the deterministic processor during the execution of the algorithm in accordance with the generated voltage profile.

3. The computing system of claim 2, wherein the controller is further configured to instruct, based on the generated voltage profile, the voltage regulator to dynamically modify the clock frequency during the execution of the algorithm.

4. The computing system of claim 3, wherein the generated voltage profile and the dynamically modified clock frequency satisfy the target profile for the deterministic processor.

5. The computing system of claim 2, wherein the impulse response comprises an output voltage of the voltage regulator as a function of time.

6. The computing system of claim 1, further comprising a circuit coupled to the voltage regulator, the circuit configured to:
    monitor the supply voltage dynamically modified during the execution of the algorithm; and
    initiate dynamic modification of an operating clock frequency of the deterministic processor during the execution of the algorithm based on the monitored supply voltage.

7. The computing system of claim 1, wherein the modified plurality of control signals are embedded into a program executing the algorithm on the deterministic processor.

8. The computing system of claim 1, wherein the algorithm is a machine learning algorithm.

9. The computing system of claim 1, wherein the deterministic processor comprises at least one array of vector multiplication functional units, memory functional units, or matrix multiplication functional units configured to execute the algorithm.

10. The computing system of claim 1, further comprising a plurality of deterministic processors, comprising the deterministic processor, wherein each deterministic processor of the plurality of deterministic processors is individually managed to allocate a power over time, wherein the power is allocated over time to prevent the plurality of deterministic processors to exceed a threshold power for the plurality of deterministic processors, and a quality of service (QOS) is maintained for one or more models executing on the plurality of deterministic processors.

11. The computing system of claim 10, wherein the plurality of control signals comprise a time sequence that controls an operation of a respective voltage regulator.

12. The computing system of claim 1, wherein the power management module is configured to determine the target profile by determining at least one target power consumption.

13. The computing system of claim 12, wherein the at least one target power consumption comprises a single power consumption level or a range of power consumption levels.

14. The computing system of claim 1, wherein the target profile comprises at least a first power consumption level and a second power consumption level.

15. The computing system of claim 14, wherein the target profile comprises information about a transition from the first power consumption level to the second power consumption level.

16. The computing system of claim 15, wherein the transition is gradual.

17. The computing system of claim 1, wherein the target profile is associated with a power consumption of the deterministic processor below a power consumption threshold level for a predefined execution time of the algorithm executed on the deterministic processor.

18. The computing system of claim 1 further comprising:
    a power management module configured to determine an initial profile for power consumption and performance of an algorithm executed on the deterministic processor, the initial profile having an initial value for the supply voltage and an initial value for the clock frequency, and to determine a target profile for power consumption and performance of the algorithm when executed on the respective deterministic processor wherein the target profile is selected from a plurality of power levels and is based on information about a future transition from a first power consumption level to a second power consumption level.

19. A non-transitory computer-readable storage medium comprising stored computer executable instructions, the computer executable instructions, when executed by a compiler operating on at least one computer processor, cause the at least one computer processor to:

generate a plurality of control signals for a respective voltage regulator of one or more voltage regulators to regulate a supply voltage of a respective deterministic processor of one or more deterministic processors, wherein the respective deterministic processor is configured to execute defined instructions at defined times during each execution of an algorithm;

determine an initial profile for power consumption and performance of the algorithm executed on the respective deterministic processor having an initial value for the supply voltage and an initial value for a clock frequency;

determine a target profile for power consumption and performance of each execution of the algorithm on the respective deterministic processor based on the defined instructions scheduled to be executed;

modify the plurality of control signals based on the initial profile and the target profile; and initiate an execution of the algorithm on the respective deterministic processor while the supply voltage is dynamically modified by the respective voltage regulator based on the modified plurality of control signals.

20. The non-transitory computer-readable storage medium of claim 19, wherein the instructions further cause the at least one computer processor to encode the modified plurality of control signals into a program executing the algorithm on the respective deterministic processor.

21. A method for regulating power consumption of a computing system comprising one or more deterministic processors and one or more voltage regulators, the method comprising:

generating a plurality of control signals for a respective voltage regulator of the one or more voltage regulators to regulate a supply voltage of a respective deterministic processor of the one or more deterministic processors, wherein the respective deterministic processor is configured to execute defined instructions at defined times during each execution of an algorithm;

determining an initial profile for power consumption and performance of an algorithm executed on the respective deterministic processor having an initial value for the supply voltage and an initial value for a clock frequency;

determining a target profile for power consumption and performance of each execution of the algorithm on the respective deterministic processor based on the defined instructions scheduled to be executed;

modifying the plurality of control signals based on the initial profile and the target profile; and executing the algorithm on the respective deterministic processor while the supply voltage is dynamically modified by the respective voltage regulator based on the modified plurality of control signals.

22. A method for regulating power consumption of a computing system comprising one or more deterministic processors and one or more voltage regulators, the method comprising:

generating a plurality of control signals for a respective voltage regulator of the one or more voltage regulators to regulate a supply voltage of a respective deterministic processor of the one or more deterministic processors, wherein the respective deterministic processor is configured to execute defined instructions at defined times during each execution of an algorithm;

determining a target profile for power consumption and performance of each execution of the algorithm executed on the respective deterministic processor based on the defined instructions scheduled to be executed;

modifying the plurality of control signals based on the target profile; and executing the algorithm on the respective deterministic processor while the supply voltage is dynamically modified by the respective voltage regulator based on the modified plurality of control signals.

23. The method of claim 22, further comprising:

determining an initial profile for power consumption and performance of the algorithm executed on the deterministic processor, the initial profile having an initial value for the supply voltage and an initial value for the clock frequency; and t determining a target profile for power consumption and performance of the algorithm when executed on the respective deterministic processor wherein the target profile is selected from a plurality of power levels and is based on information about a future transition from a first power consumption level to a second power consumption level.

\* \* \* \* \*